W. MORRISON.
ELECTROLYTIC RECTIFIER.
APPLICATION FILED FEB. 29, 1912.
1,023,092.
Patented Apr. 9, 1912.
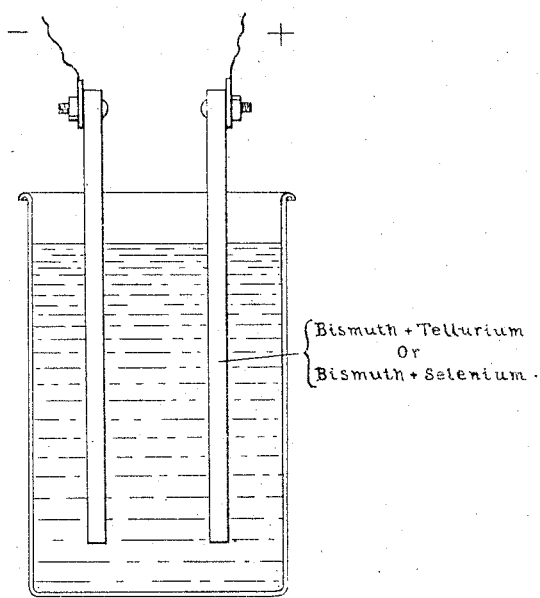
Bismuth + Tellurium
Or
Bismuth + Selenium.

UNITED STATES PATENT OFFICE.

WILLIAM MORRISON, OF DES MOINES, IOWA.

ELECTROLYTIC RECTIFIER.

1,023,092.  Specification of Letters Patent.  Patented Apr. 9, 1912.

Application filed February 29, 1912. Serial No. 680,730.

*To all whom it may concern:*

Be it known that I, WILLIAM MORRISON, a citizen of the United States, residing at Des Moines, in the county of Polk and State of Iowa, have invented certain new and useful Improvements in Electrolytic Rectifiers, of which the following is a specification.

This invention is an asymmetric electrolytic cell for rectifying alternating electric currents.

In my U. S. application for Letters Patent, Ser. No. 587,129, filed October 14, 1910, I have described and claimed an asymmetric cell having an anode of bismuth and an electrolyte of a chromate, phosphate or bicarbonate solution. The present invention is a specific improvement thereon, in that an anode is employed consisting of an alloy of bismuth and an element of the periodic sulfur group having an atomic weight higher than that of sulfur, to wit tellurium or selenium.

The anode preferably consists of a cast rod or plate of bismuth alloyed with a relatively small amount of tellurium, one per cent or less of tellurium giving a casting which is fine-grained, dense and strong. The cathode may be a rod or plate of carbon or lead. The electrolyte is preferably a solution of a chromium-oxygen compound, for example potassium chromate or dichromate. A solution of an alkali-metal phosphate or bicarbonate, or of both a chromate and phosphate or bicarbonate, or one of the solutions heretofore used with aluminum anodes, may also be employed. The solution may be neutral or somewhat acid or alkaline. For high current-densities a strong solution is preferably employed.

The small amount of tellurium or selenium alloyed with the bismuth does not noticeably impair or affect its action as an asymmetric electrode. When an anode of the alloy is used in a chromate solution, it apparently becomes coated with a permanent adherent film of bismuth chromate, which is of high resistivity and is substantially insoluble in the solution, being one of the most insoluble compounds known.

The accompanying drawing illustrates the described rectifier, the figure being a transverse vertical section through the cell and electrolyte, the electrodes being shown in elevation.

I claim:

1. In an electrolytic rectifier, an anode of bismuth alloyed with an element of the periodic sulfur group having a higher atomic weight than sulfur, an electrolyte capable of reacting on bismuth to give an asymmetric film, and a cathode.

2. In an electrolytic rectifier, an anode of bismuth alloyed with tellurium, an electrolyte capable of reacting on bismuth to give an asymmetric film, and a cathode.

3. In an electrolytic rectifier, an anode of bismuth alloyed with an element of the periodic sulfur group having a higher atomic weight than sulfur, an electrolyte containing a soluble chromate, and a cathode.

4. In an electrolytic rectifier, an anode of bismuth alloyed with tellurium, an electrolyte containing a soluble chromate, and a cathode.

In testimony whereof I affix my signature in presence of two witnesses.

WILLIAM MORRISON.

Witnesses:
EUGENE A. BYRNES,
N. P. LEONARD.